US007447569B2

(12) United States Patent
Weis et al.

(10) Patent No.: US 7,447,569 B2
(45) Date of Patent: Nov. 4, 2008

(54) DEVICE FOR EXCHANGING DATA BETWEEN MOVING VEHICLES

(76) Inventors: Julian Weis, Breitestrasse 2, Waldkirch (DE) 79183; Patrick Weis, Breitestrasse 2, Waldkirch (DE) 79183

( * ) Notice: Subject to any disclaimer, the term of this patent is extended or adjusted under 35 U.S.C. 154(b) by 540 days.

(21) Appl. No.: 10/560,976

(22) PCT Filed: Jun. 25, 2003

(86) PCT No.: PCT/EP03/06689

§ 371 (c)(1),
(2), (4) Date: Dec. 15, 2005

(87) PCT Pub. No.: WO2005/004079

PCT Pub. Date: Jan. 13, 2005

(65) Prior Publication Data

US 2007/0093959 A1 Apr. 26, 2007

(51) Int. Cl.
*G08G 1/01* (2006.01)
*G06F 19/00* (2006.01)

(52) U.S. Cl. ............................... 701/1; 701/2; 701/117; 340/992

(58) Field of Classification Search ..................... 701/1, 701/2, 200, 211, 207, 117, 118; 340/992, 340/905, 995.13
See application file for complete search history.

(56) References Cited

U.S. PATENT DOCUMENTS

| | | | | |
|---|---|---|---|---|
| 5,173,691 | A | 12/1992 | Sumner | |
| 6,960,997 | B2 * | 11/2005 | Gieseke et al. | 340/539.13 |
| 6,970,786 | B2 * | 11/2005 | Hayama et al. | 701/209 |
| 2002/0030611 | A1 | 3/2002 | Nuesser et al. | |
| 2002/0150050 | A1 | 10/2002 | Nathanson | |

* cited by examiner

*Primary Examiner*—Tan Q Nguyen
(74) *Attorney, Agent, or Firm*—Baker & Daniels LLP

(57) ABSTRACT

A device for exchanging data between moving vehicles comprises a receiving module (4) for receiving data messages broadcasted from other vehicles equipped with said device, sensing and processing means (6, 9, 15) for generating vehiclespecific data and a broadcasting module (5) for broadcasting data messages including said received data and said vehicle specific data. The device further includes data processing means (16, 17) inseparably combining corresponding data from said received data and from said vehicle-specific data to synthesis data messages comprising time stamp data. The broadcasting module (5) is adapted to broadcast said synthesis data messages. Said data processing means (15, 16) include at least one evaluation member responsive to said time stamp data and evaluating the contribution of received synthesis data messages according to said time stamp data.

8 Claims, 23 Drawing Sheets

DEVICE FOR EXCHANGING DATA BETWEEN MOVING VEHICLES

Figure 1:
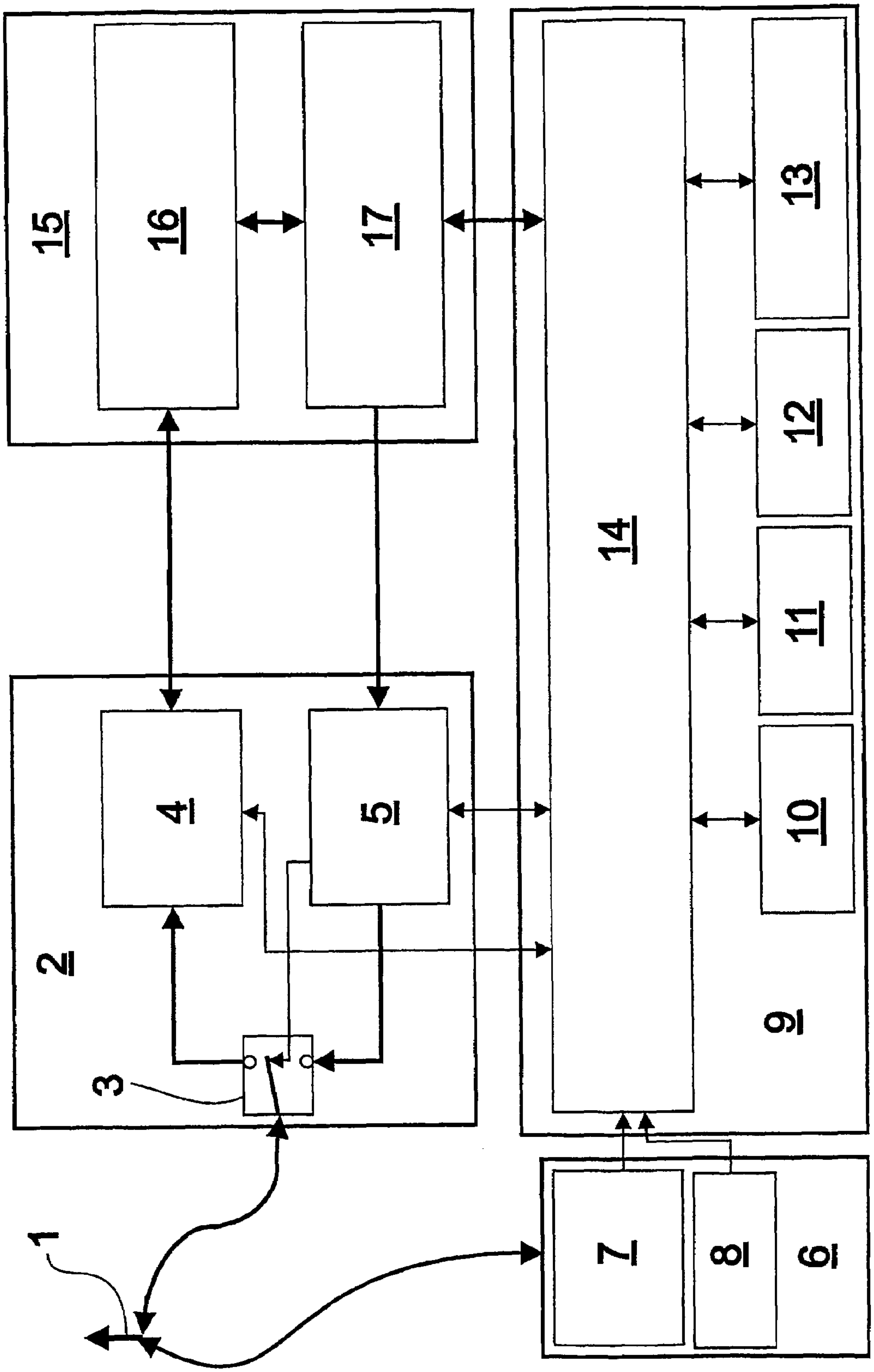

The invention relates to a device for exchanging data between moving vehicles comprising a receiving module for receiving data messages broadcasted from other vehicles equipped with said device, sensing and processing means for generating vehicle-specific data and a broadcasting module for broadcasting data messages including said received data and said vehicle-specific data.

A device of this kind is known from document U.S. Pat. No. 5,428,544. The known device comprises a receiving module for receiving data messages broadcasted from moving vehicles equipped with said device. A displacement sensor and a direction sensor of sensing means are connected to a microcomputer including processing means for generating vehicle-specific data of a vehicle equipped with said device. The known device furthermore comprises a passing-by-vehicle information register for storing received data messages broadcasted from other vehicles. A self-information register of the microcomputer is adapted to store the vehicle-specific data generated by the sensing means. A transmitter is connected to the passing-by-vehicle information register and the self-information register and is adapted to broadcast data messages including said received data and said vehicle-specific data.

The device according to document U.S. Pat. No. 5,428,544 is adapted to generate vehicle-specific data of the vehicle equipped with said device, to receive data broadcasted from other vehicles equipped with said device and to broadcast the self-generated vehicle-specific data and the received data to other vehicles. Therefore, the known device serves as a relay station for the received data. However, the above-mentioned device has the drawback that the received data may be used to trace the track of an individual vehicle which may cause some problems with respect to the privacy of the user of the specific vehicle. Furthermore, the received data are unspecific with respect to relevance.

Therefore, the present invention seeks to improve a device of the above-mentioned kind in such a way that the privacy of the user of a vehicle equipped with said device is assured and that the broadcasted data messages include information with respect to relevance for devices receiving said data messages.

In accordance with the invention, this object is accomplished by a device of the above kind in that the device further includes data processing means inseparably combining corresponding data from said received data and from said vehicle-specific data to synthesis data messages comprising time stamp data, that the broadcasting module is adapted to broadcast said synthesis data messages and that said data processing means include at least one evaluation member for evaluating the contribution of received synthesis data messages according to said time stamp data.

According to the invention, said received data and said vehicle-specific data are combined to synthesis data messages including inseparably combined data from said received data and vehicle-specific data and furthermore including time stamp data. Therefore, the privacy of the user of vehicle equipped with said device is assured due to the fact that the vehicle-specific data of the respective vehicle merge into the synthesis data message. Consequently, it is not possible to trace back the track of a specific vehicle on the basis of the synthesis data messages. Furthermore, each synthesis data message includes time stamp data processed by the at least one evaluation member in order to take into account the relevance of the specific synthesis data message. Further preferred embodiments and advantages of the invention are included in the dependent claims.

Figure 2:
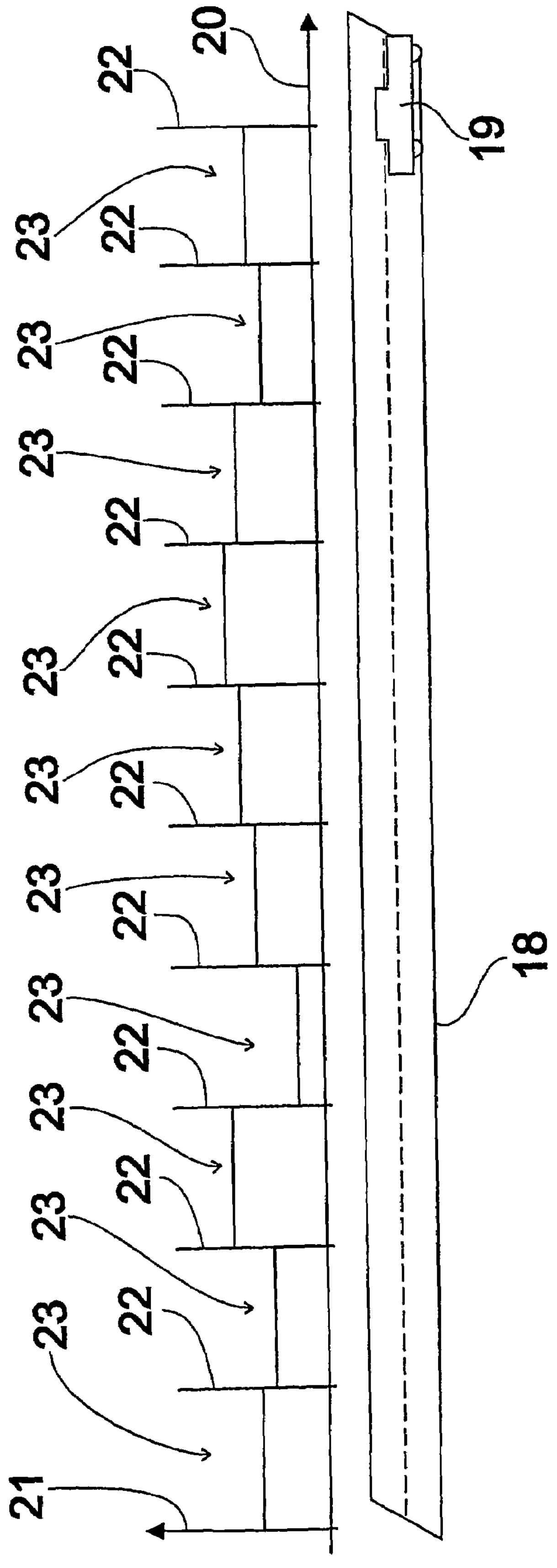
Figure 3:
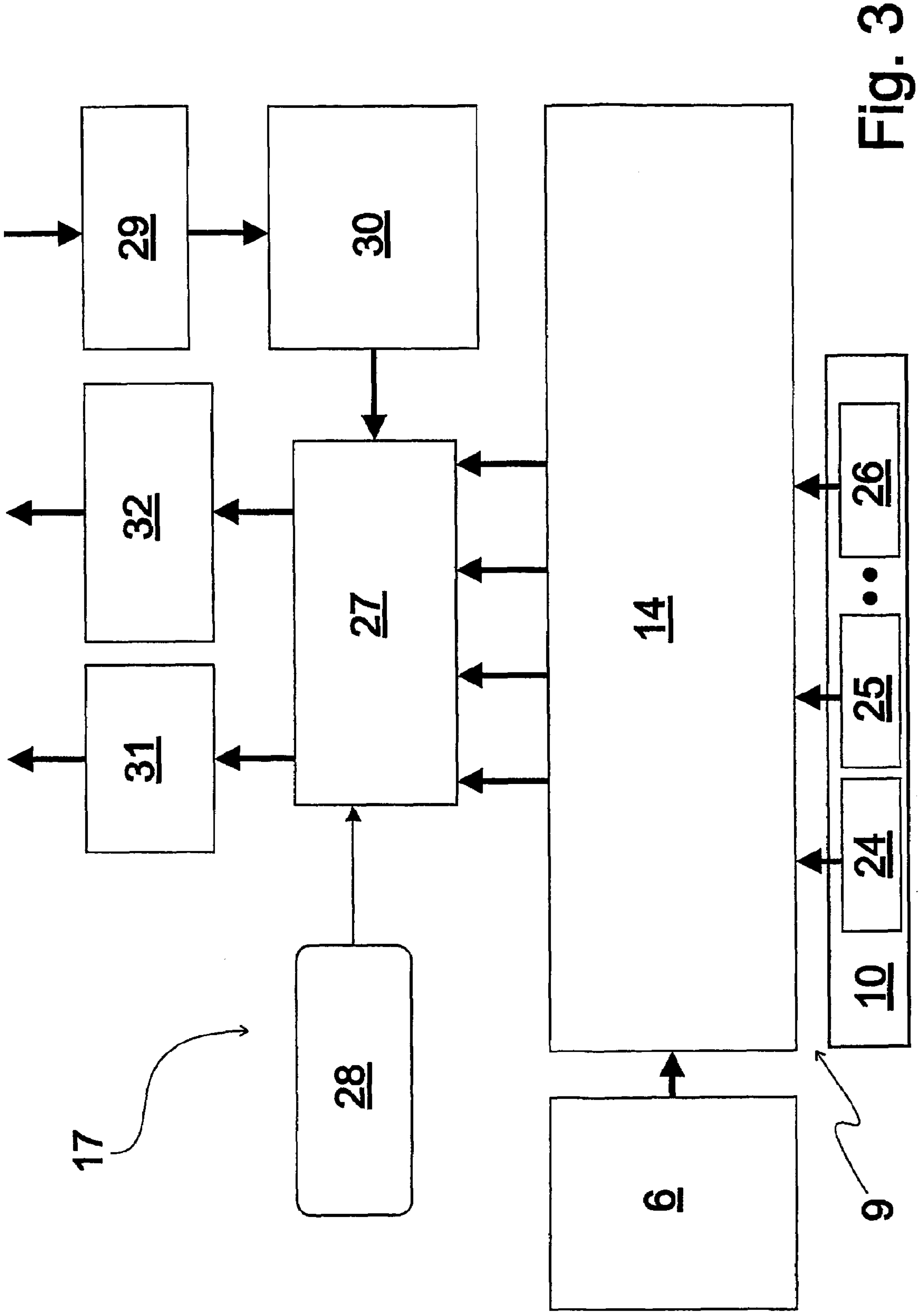
Figure 5:
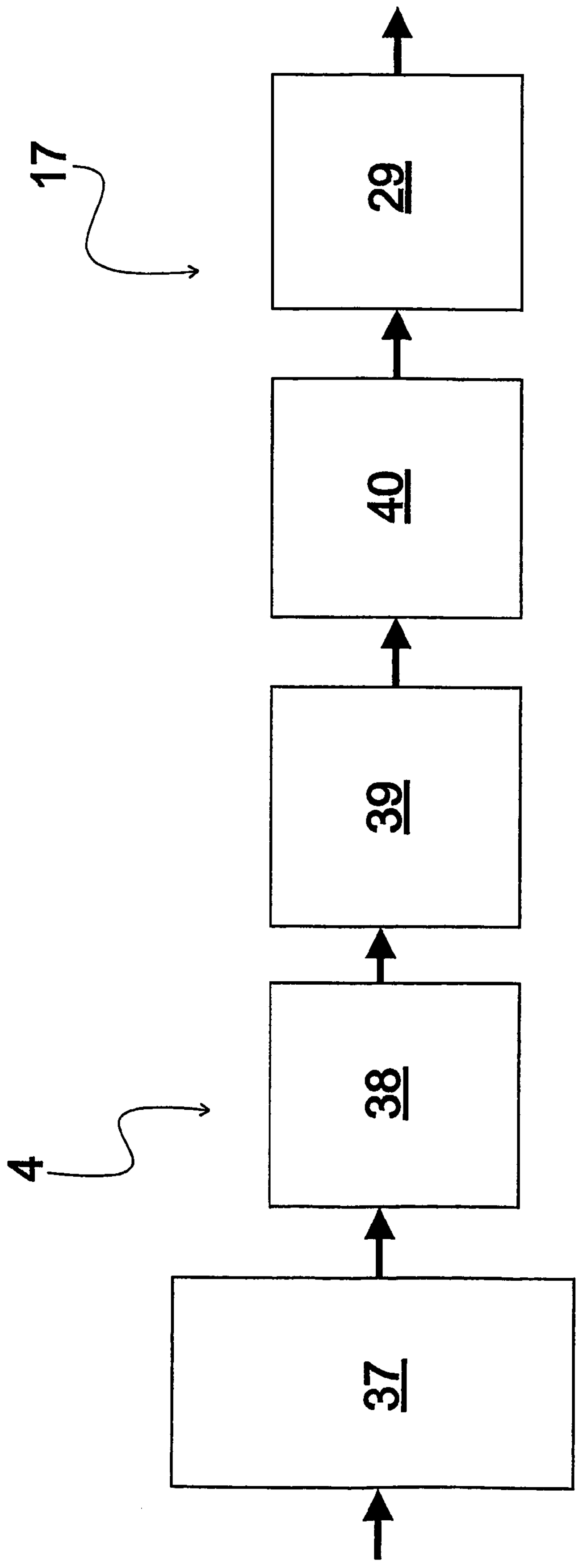
Figure 6:
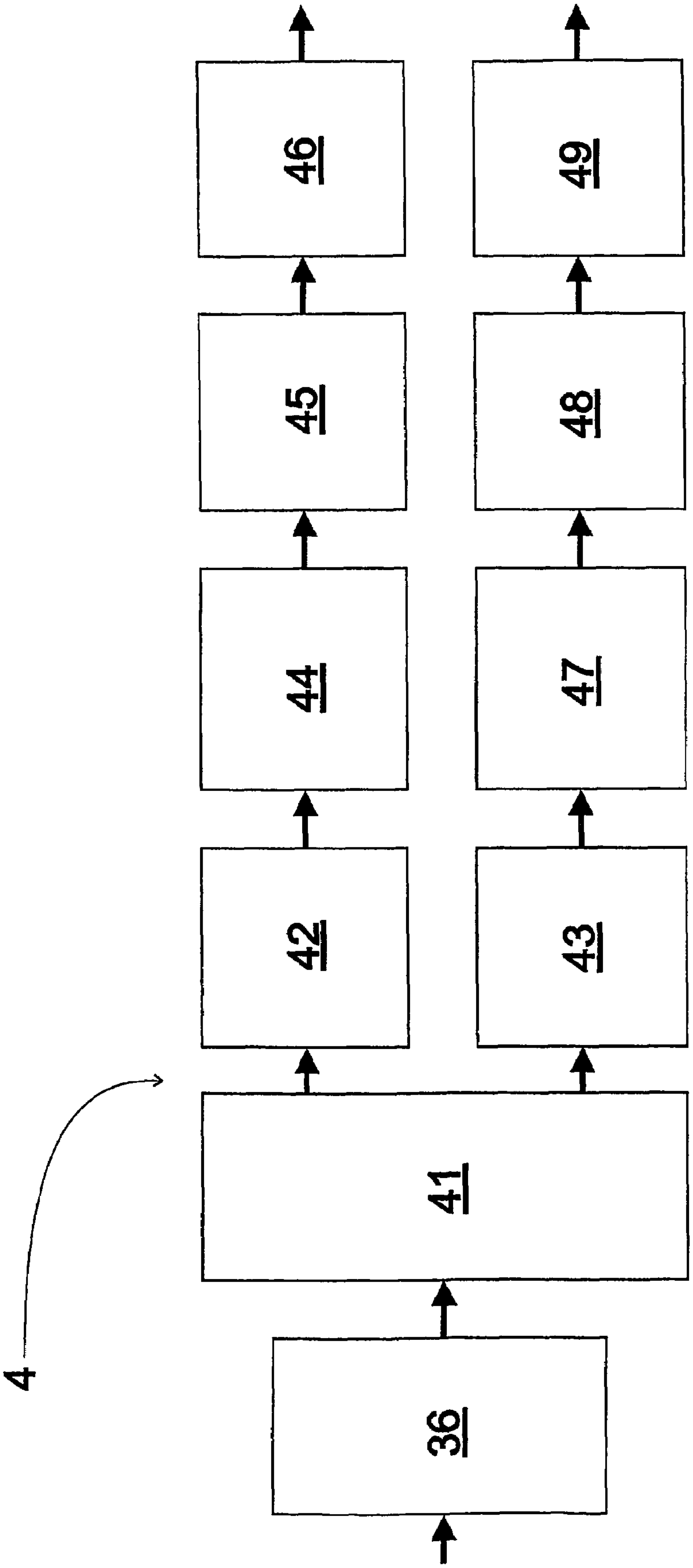
Figure 7:
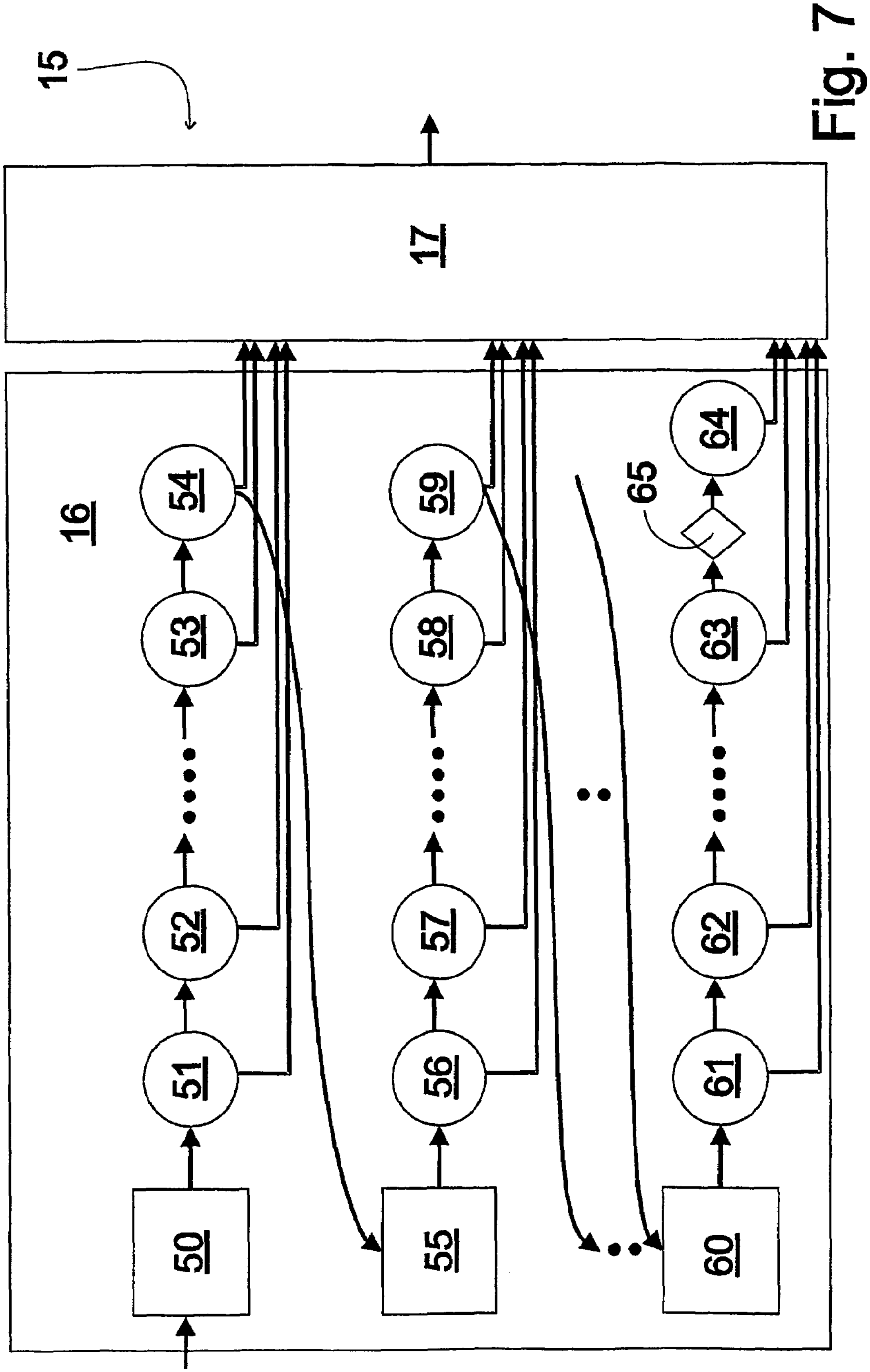
Figure 8:
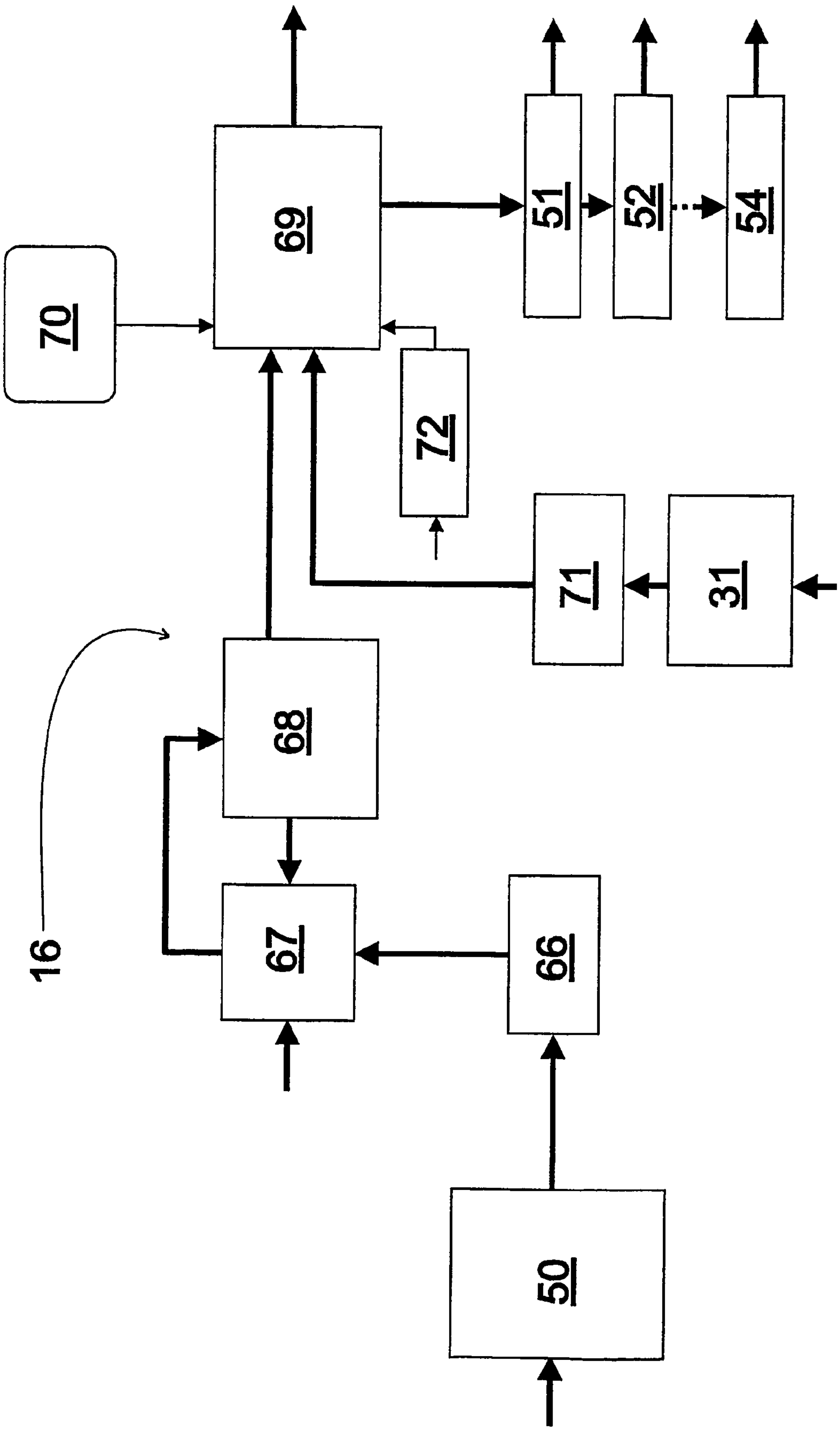
Figure 9:
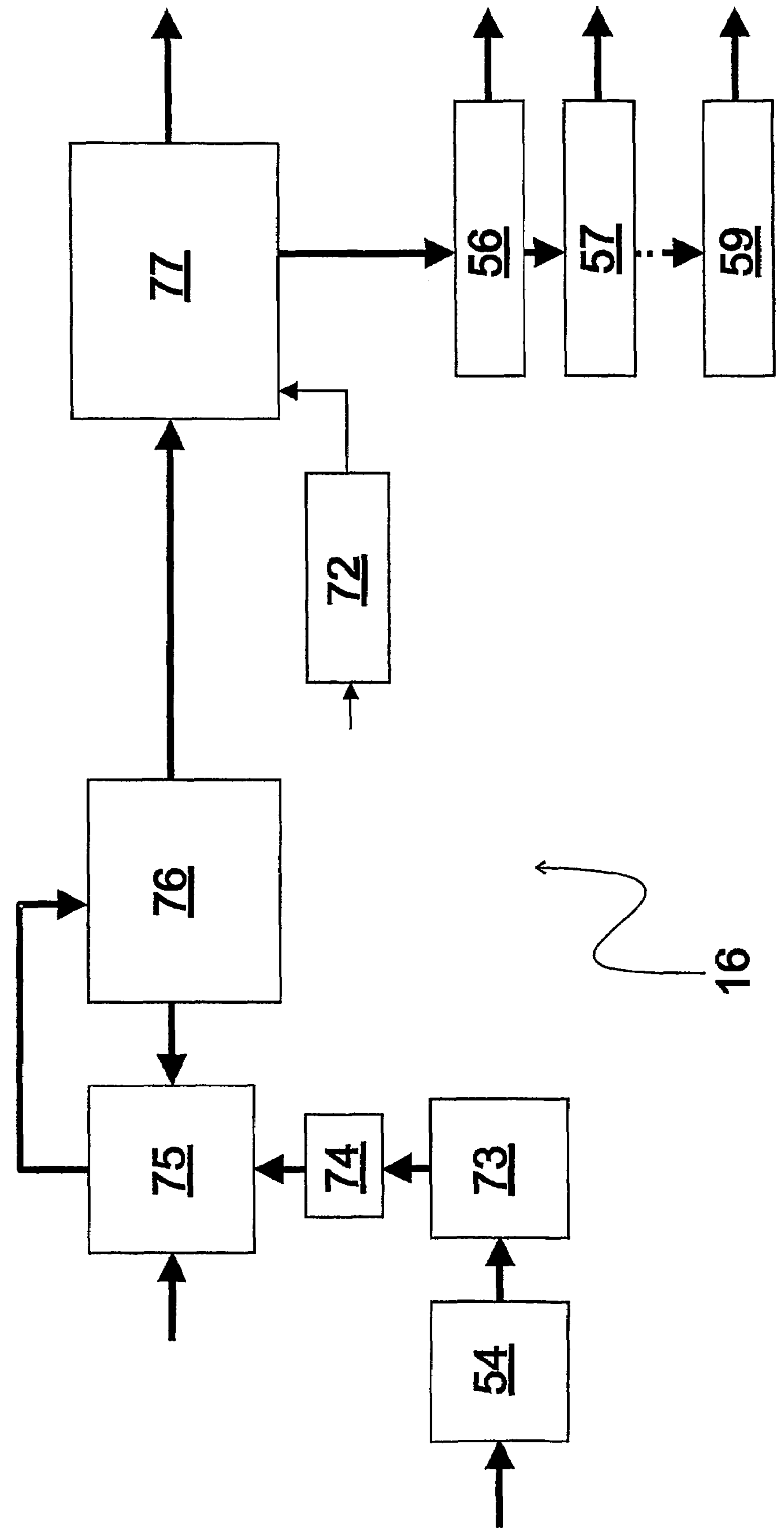
Figure 10:
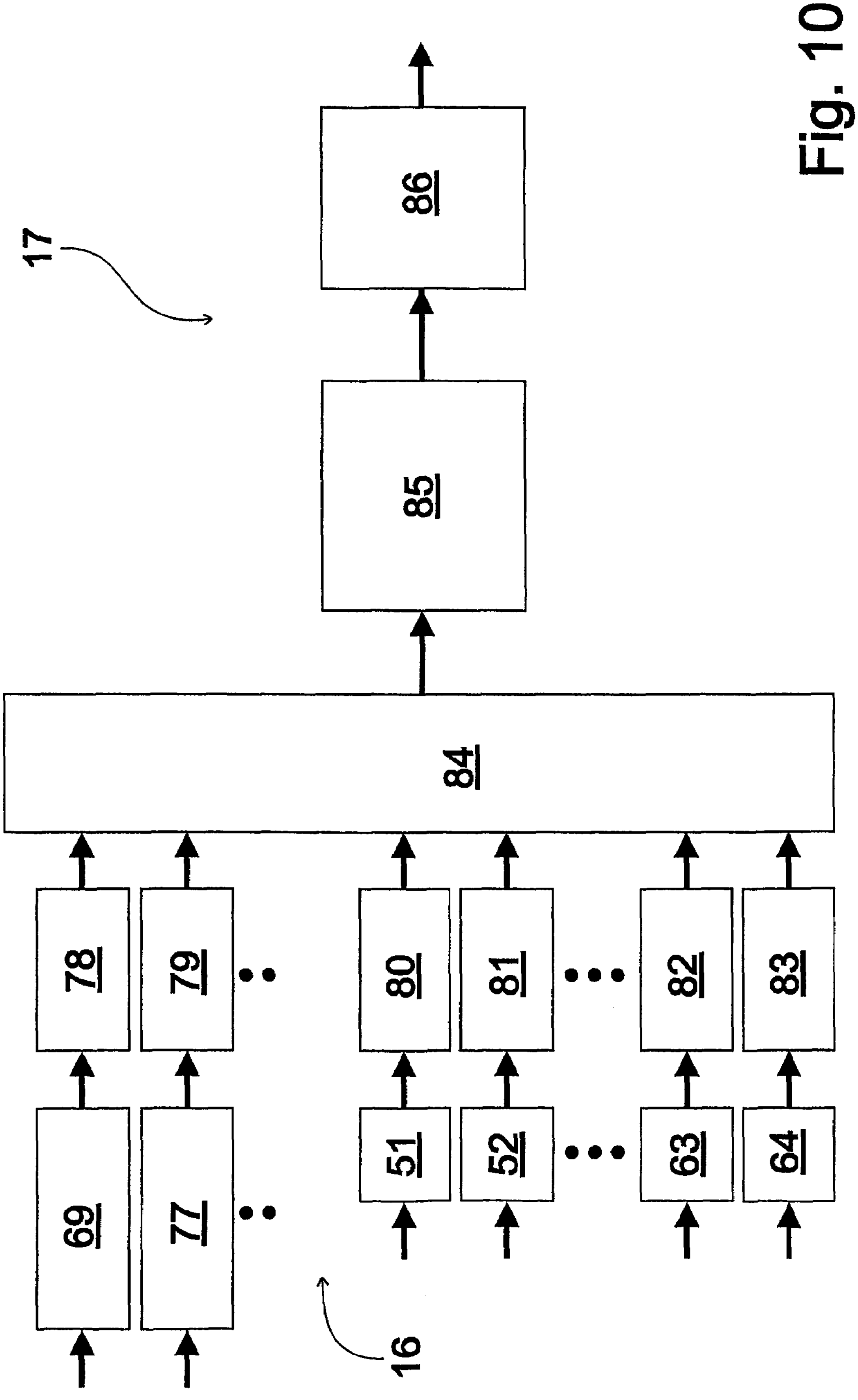
Figure 11:
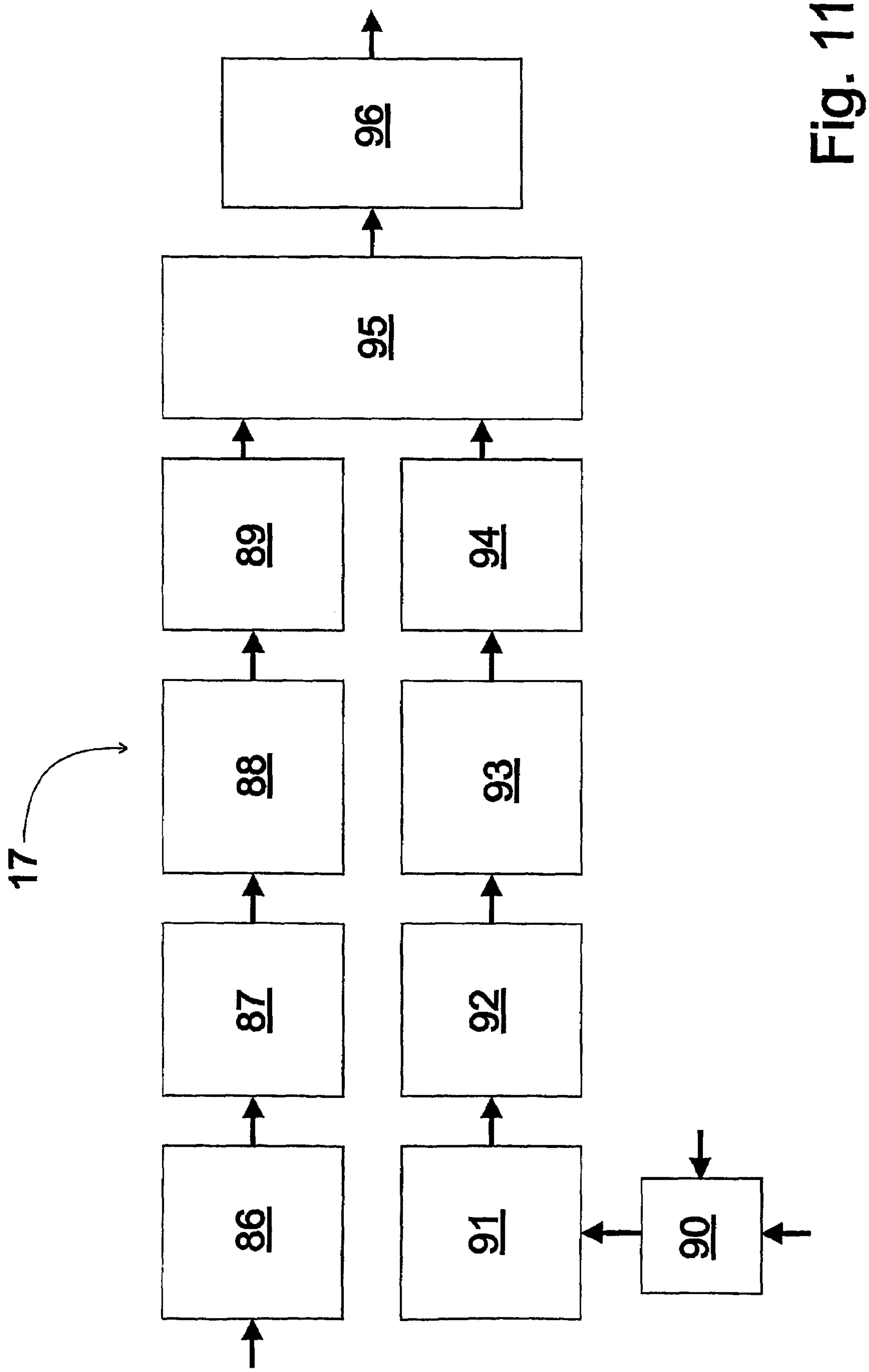
Figure 12:
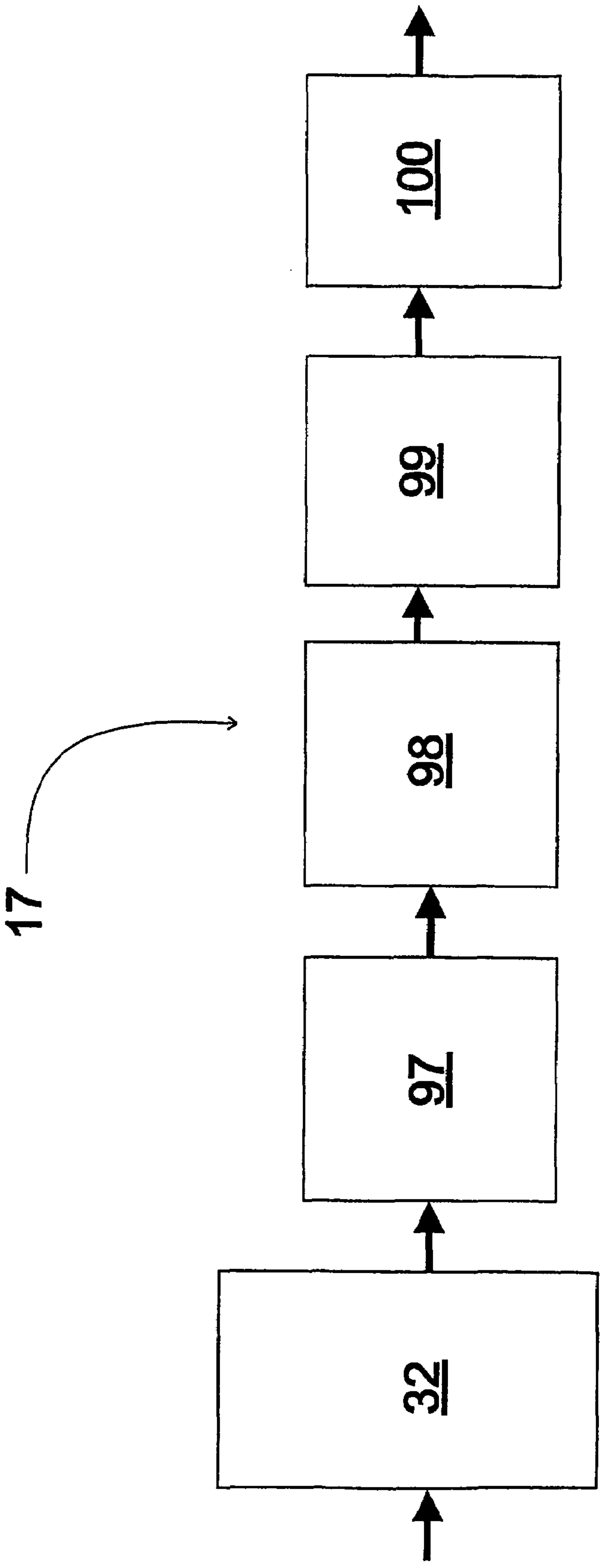
Figure 13:
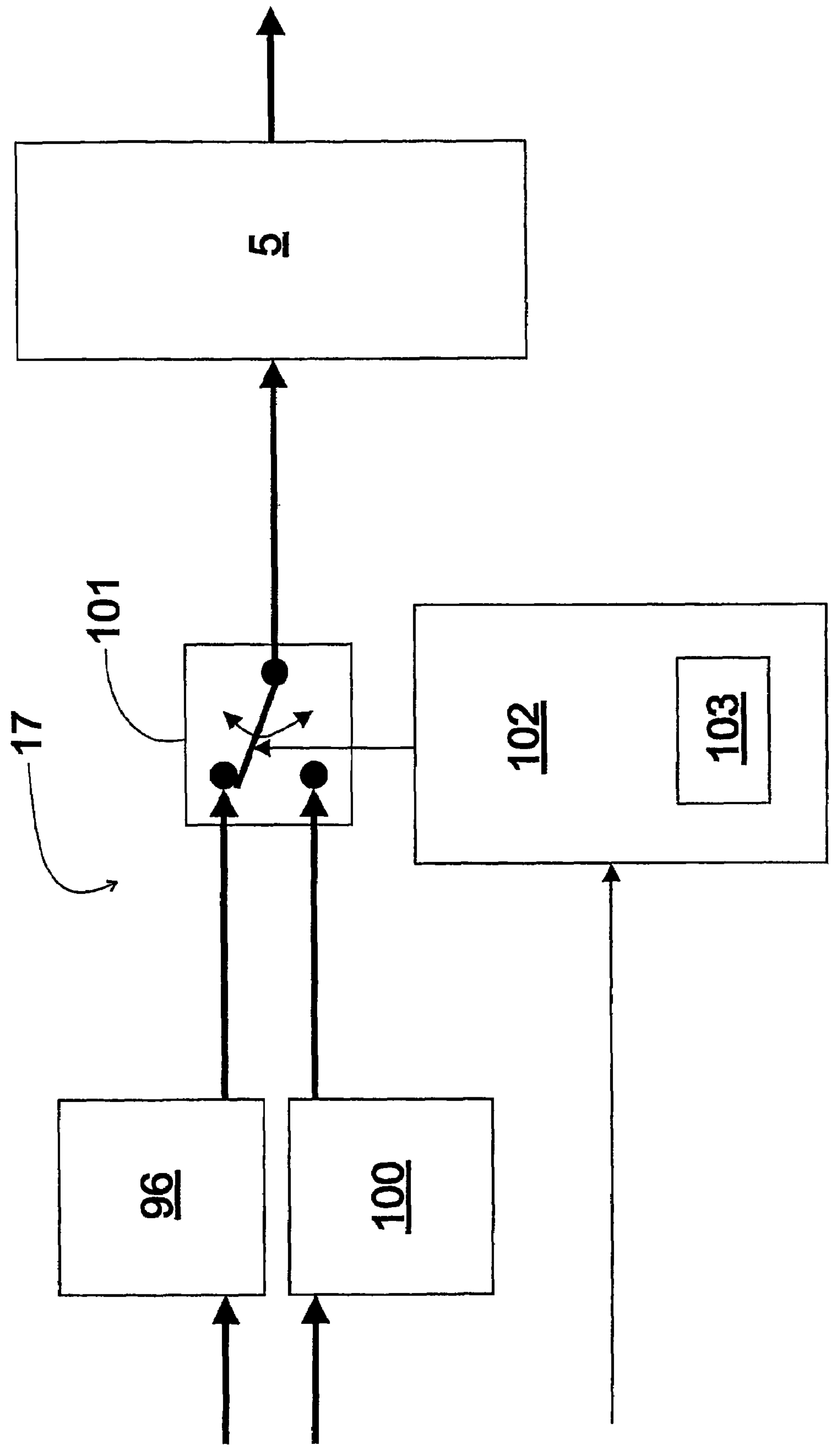
Figure 14:
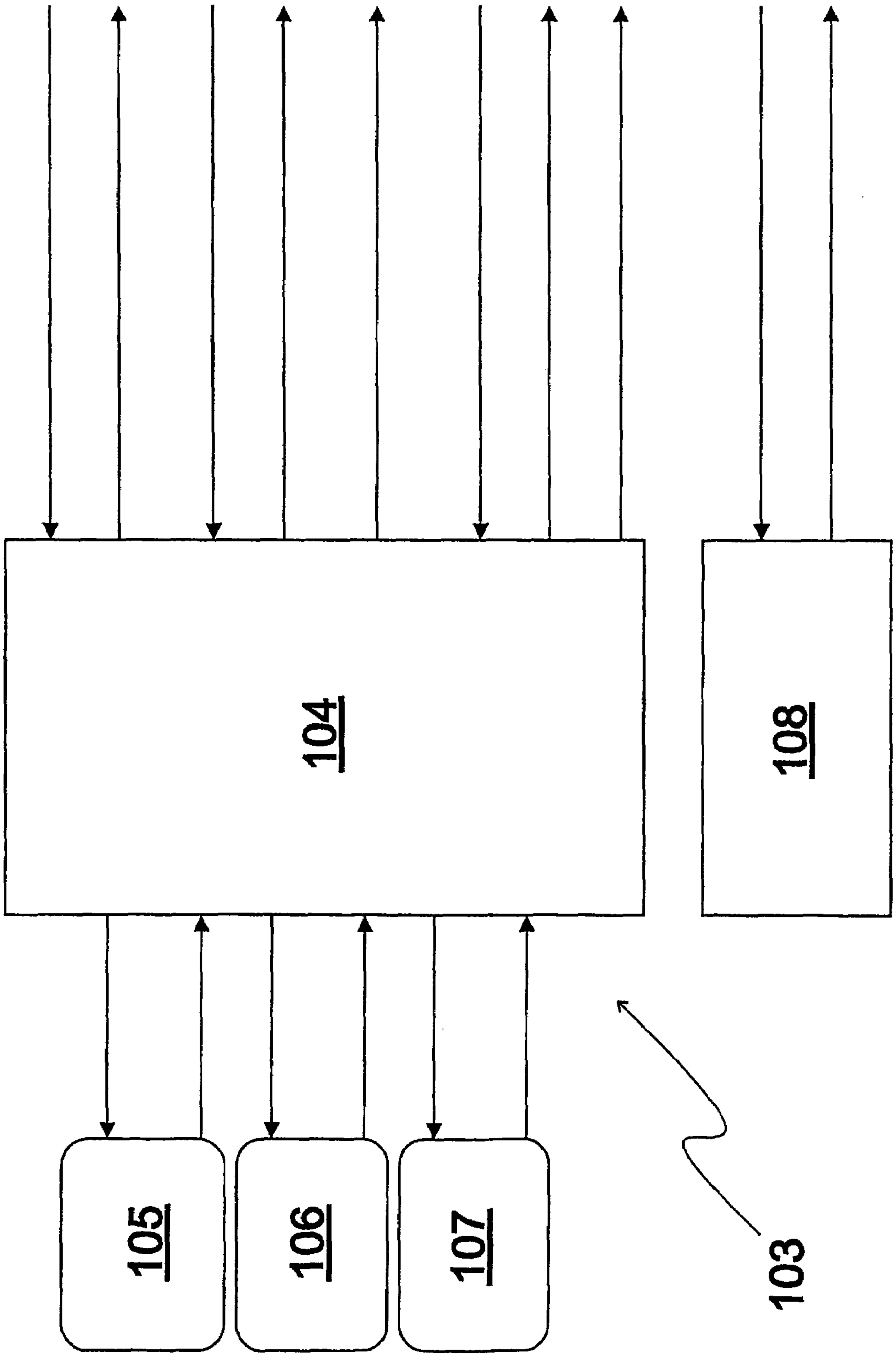
Figure 15:
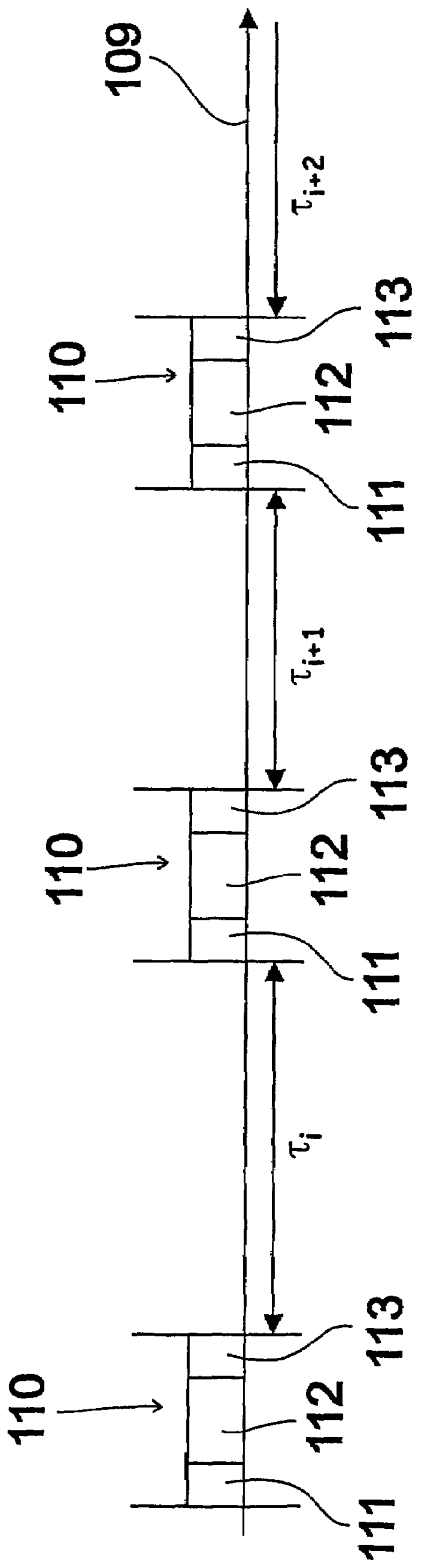
Figure 16:
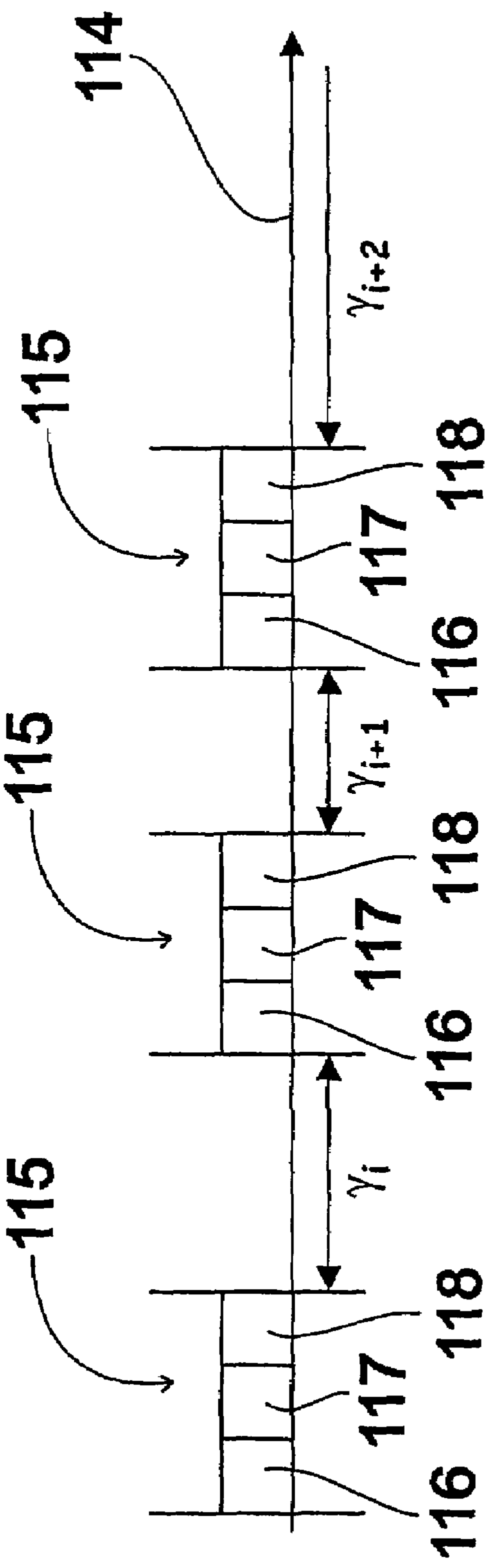
Figure 19:
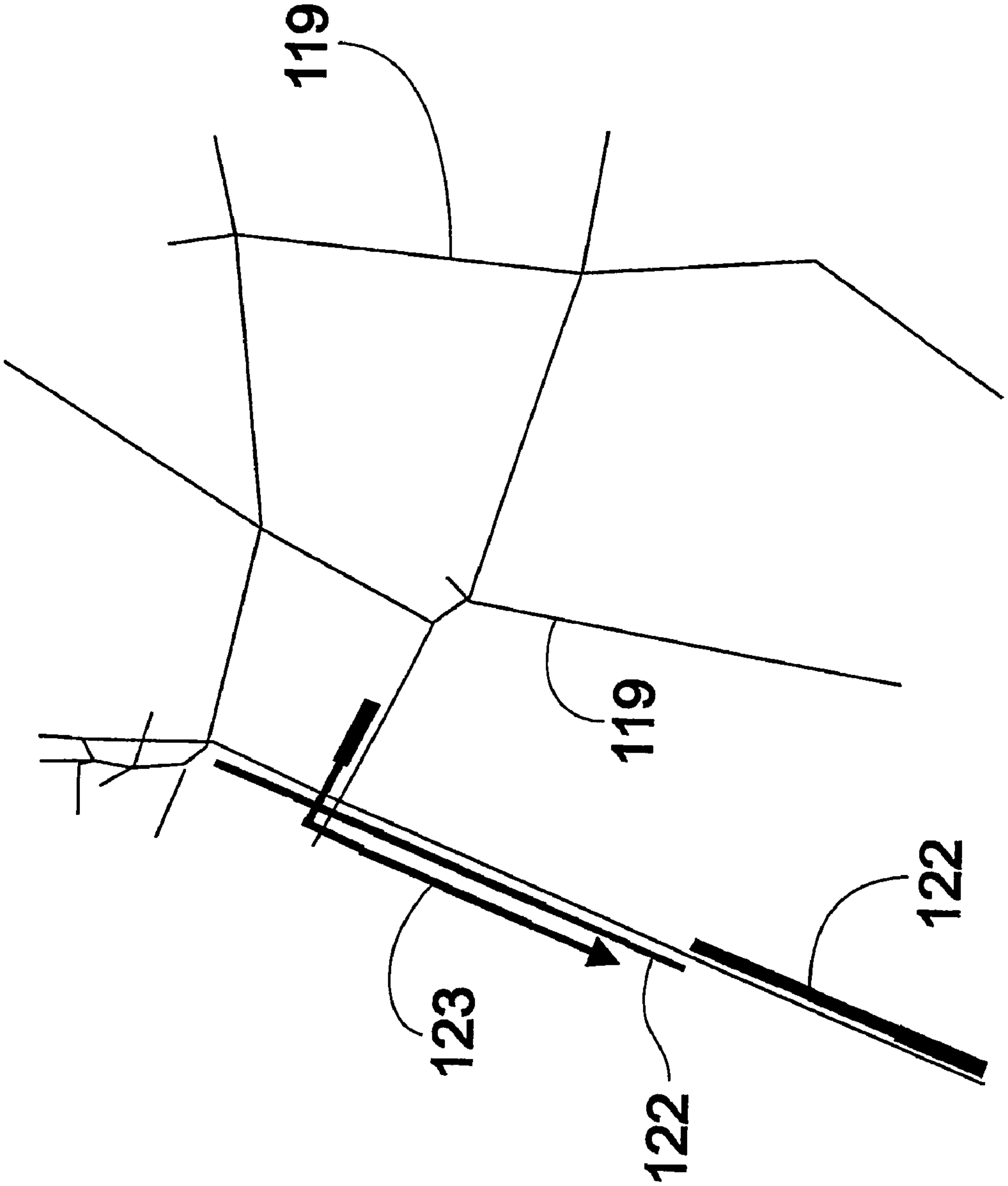
Figure 20:
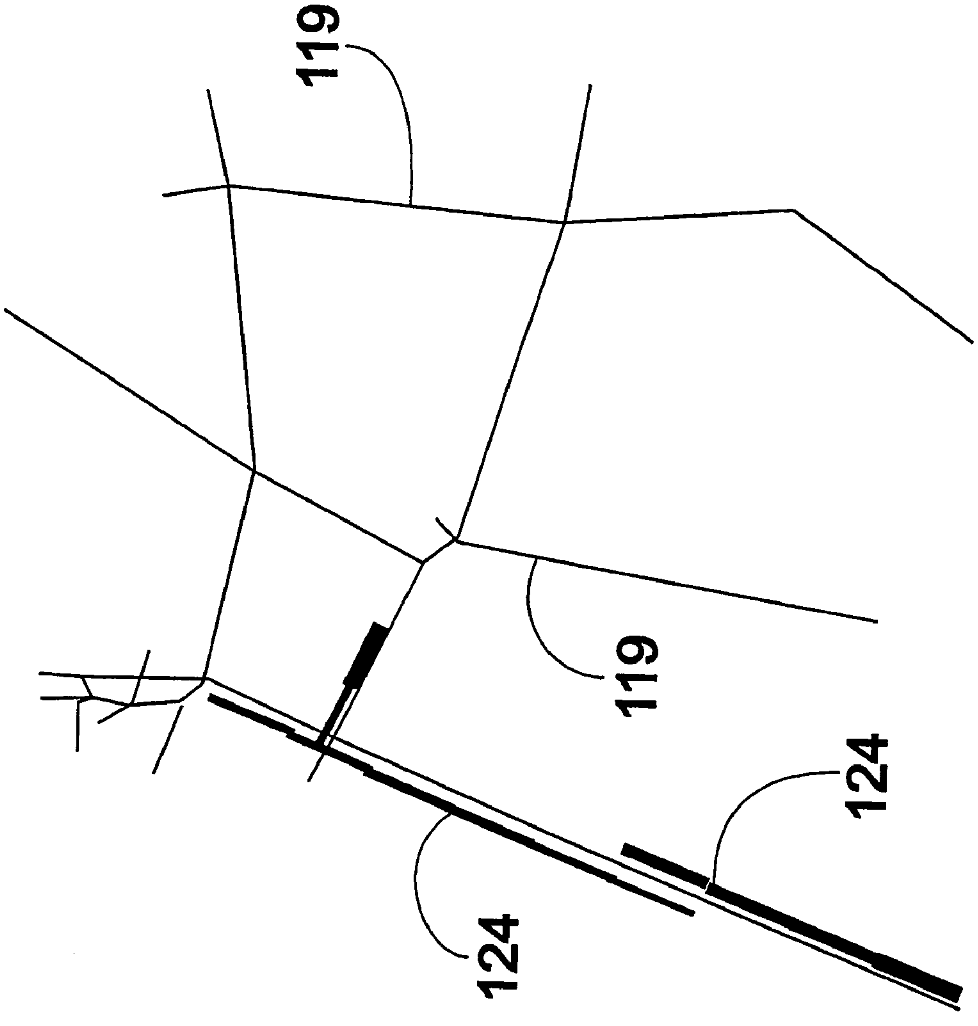
Figure 21:
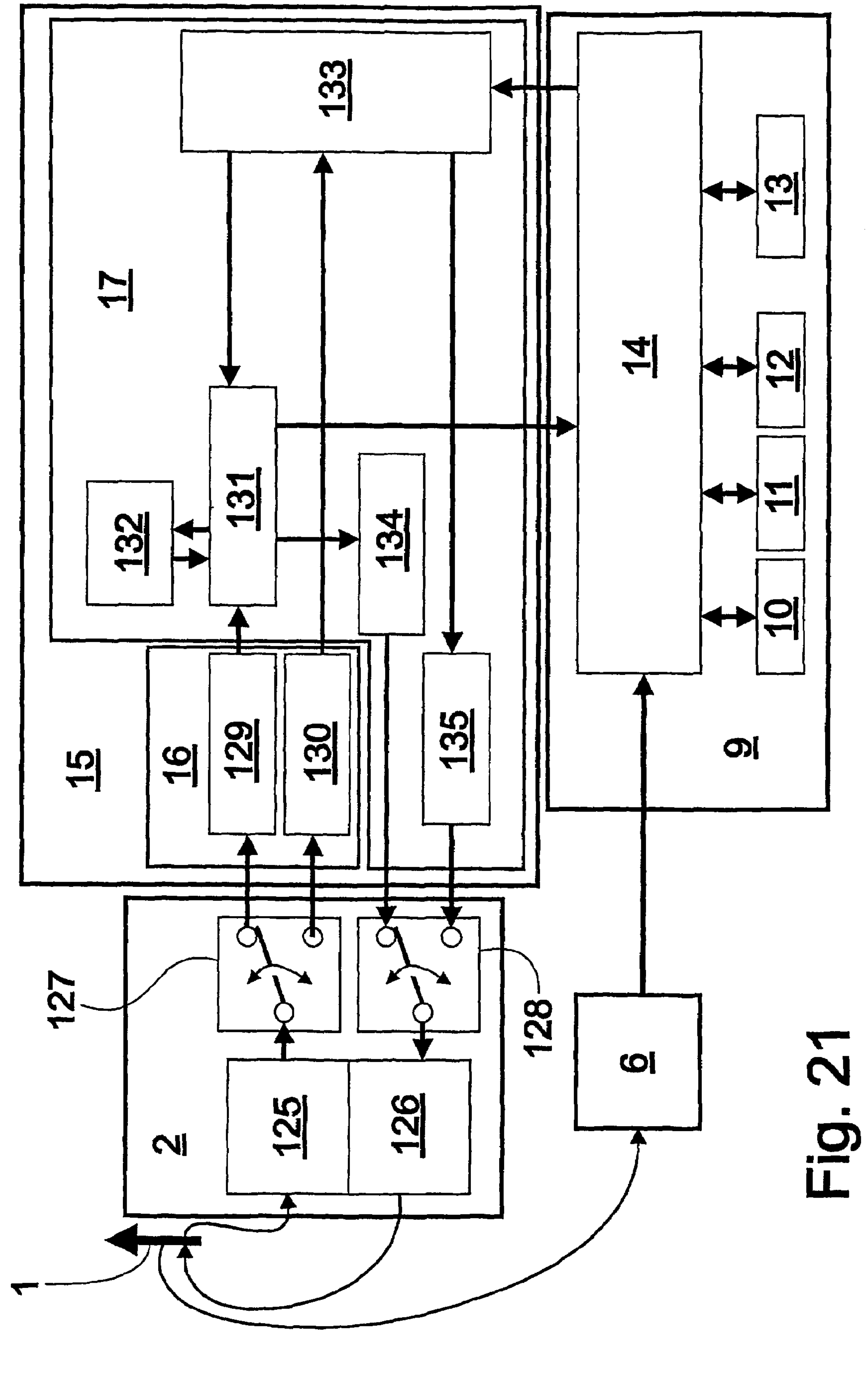
Figure 22:
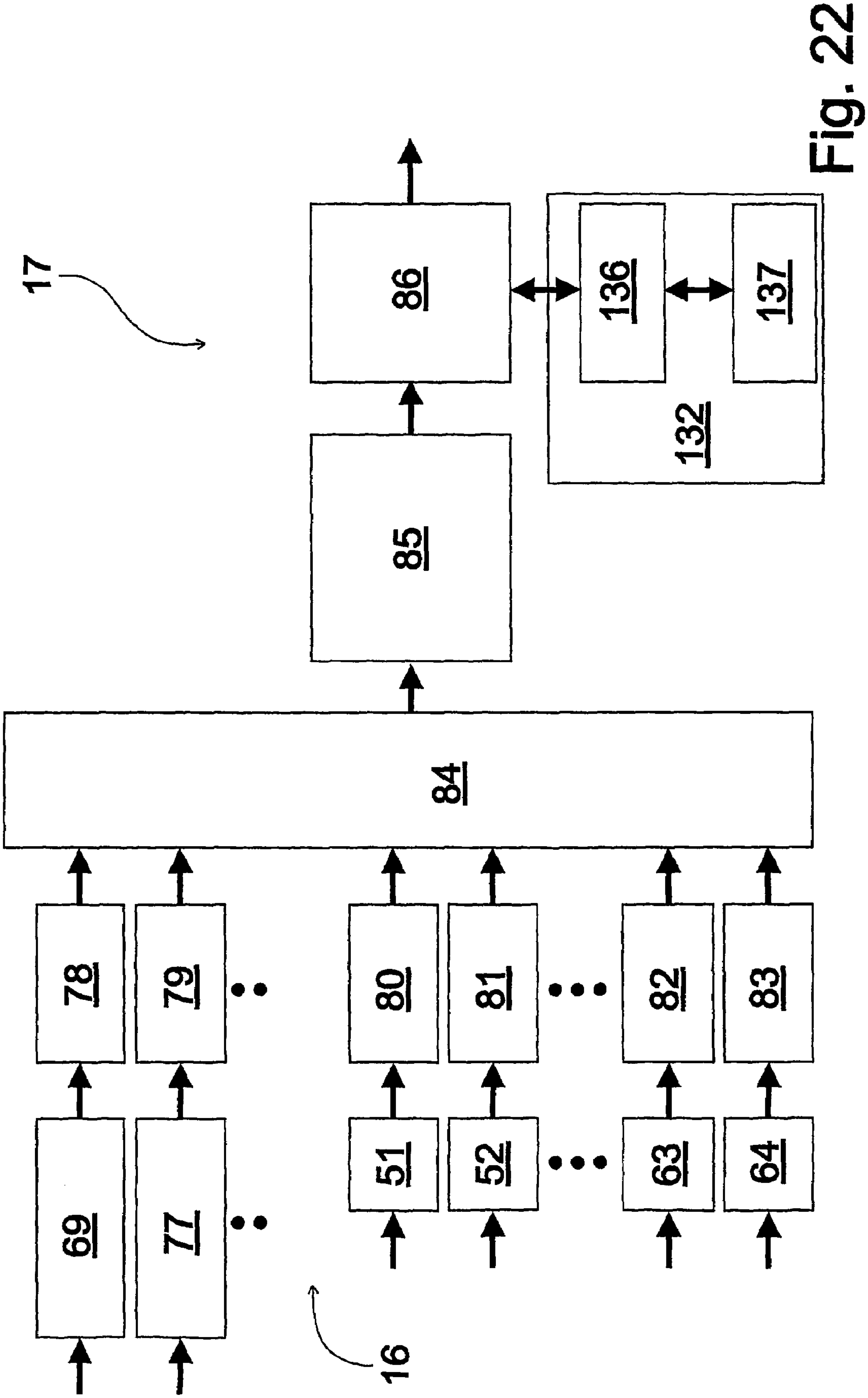
Figure 23:
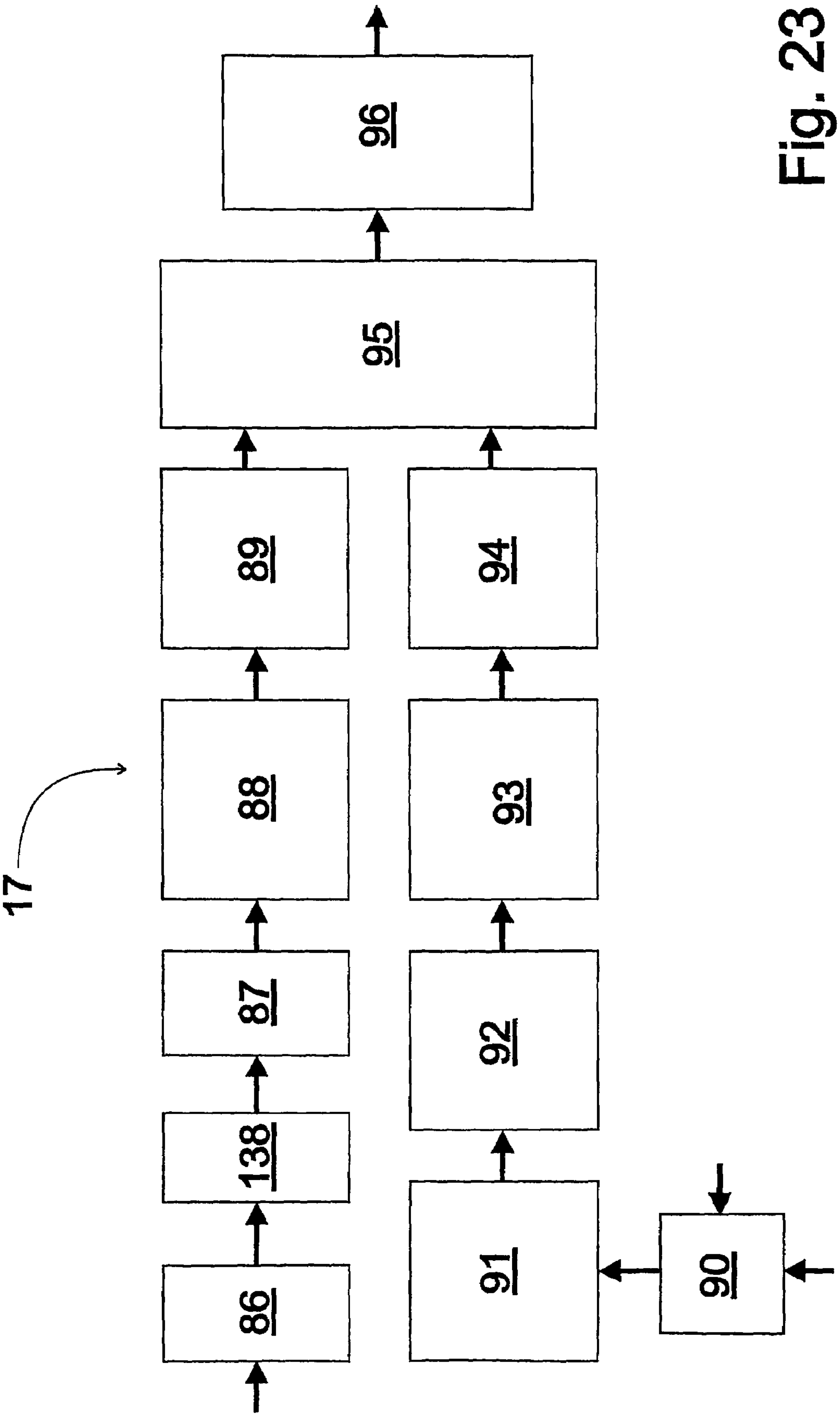

The invention will be described by way of example on the basis of a specific embodiment accompanied by the drawings, in which FIG. 1 shows in a block diagram the main functional elements of an embodiment of the present invention, FIG. 2 shows in a diagram a track of a moving vehicle equipped with a device according to the present invention, FIG. 3 shows in the block diagram a sensing module and track-related elements of a map synthesis module of the embodiment of FIG. 1, FIG. 4 to FIG. 6 show in block diagrams elements of a receiving module of the embodiment of FIG. 1, FIG. 7 shows in the block diagram the fundamental functioning of a map processing unit of the embodiment of FIG. 1, FIG. 8 and FIG. 9 show in block diagrams a map preprocessing module of the embodiment of FIG. 1, FIG. 10 to FIG. 13 show in block diagrams synthesis related elements of the map synthesis module of the embodiment of FIG. 1, FIG. 14 shows in the block diagram time-related elements of a controller of the embodiment of FIG. 1, FIG. 15 and FIG. 16 show in time diagrams sequences of broadcasted synthesis data messages and presence data messages, FIG. 17 to FIG. 20 show in schematic diagrams the outputs of display means of the illustrated embodiment of the present invention in the course of reception of various synthesis data messages from further vehicles equipped with devices according to the present invention and FIG. 21 to FIG. 23 show in block diagrams corresponding to FIG. 1, FIG. 10 and FIG. 11 a further embodiment of the present invention.

FIG. 1 shows in a block diagram the main functional elements of an embodiment of a device according to the present invention. The embodiment comprises antenna means 1 adapted to broadcast and receive synthesis and presence data messages in a wavelength range reserved for short-range applications, typically in the 2.4 GHz or 5 GHz band. Furthermore, the antenna means 1 are adapted to receive positioning signals, e.g. global positioning system (GPS) signals.

The antenna means 1 are connected to a radio unit 2 of the device comprising a mode selector 3. The mode selector 3 is connected to a receiving module 4 and a broadcasting module 5 of the radio unit 2. The broadcasting module 5 is adapted to switch the mode selector 3 from the normal receiving state into the broadcasting state.

The embodiment of FIG. 1 furthermore includes a positioning unit 6 connected to the antenna means 1. The positioning unit 6 comprises a position determinating module 7 and a time module 8 adapted to generate position and time data from the received positioning signals.

The embodiment of FIG. 1 comprises a sensing and interface unit 9 of sensing and processing means connected to the radio unit 2 and the positioning unit 6. The sensing and interface unit 9 includes a sensing module 10 including at least a velocity sensor for sensing the velocity of a vehicle equipped with the device according to the present invention. The sensing module 10 may further include sensors for further quantities of interest in operating the vehicle like the temperature or humidity of the environment. The sensing and interface unit 9 according to FIG. 1 further comprises an input module 11 like a speech recognition interface, a keyboard or a touch-sensitive input device for the input of user-specific data, an output module 12 like a display for the output of user-relevant data and a memory device reader 13 for reading and downloading authorized date, e.g. authorized software, which is checked by the memory device reader 13 e.g. via a digital signature or cryptographic methods.

The sensing and interface unit 9 further includes a controller 14 connected to the position determinating module 7, the time module 8, the sensing module 10, the input module 11, the output module 12 and the memory device reader 13 for controlling the input and output of data of the sensing and interface unit 9.

The embodiment according to FIG. 1 furthermore comprises a map processing unit 15 of the sensing and processing means connected to the radio unit 2 and the sensing and interface unit 9. The map processing unit 15 includes a map preprocessing module 16 and a map synthesis module 17 connected with each other. The map preprocessing module 16 is further connected to the receiving module 4, and the map synthesis module 17 is further connected to the broadcasting module 5 and the controller 14.

FIG. 2 shows in a diagram a track 18 of an autonomous moving vehicle 19 equipped with a device according to the present invention. By way of example, the vehicle 19 is a power-driven vehicle like a motorcar, a motortruck or a motorcycle moving along a highway or a freeway as example for the track 18. Furthermore, FIG. 2 shows a track axis 20 and a velocity axis 21. At certain, e.g. regularly spaced track points 22, the position and mean velocity in the preceding track segment 23 starting with the preceding track point 22 is calculated by means of the positioning unit 6 and the sensing module 10. Furthermore, for each track segment 23 binary direction indication data are generated by means of the positioning unit 6. A first value of the direction indication data is indicative for a positive direction, i. e. having a stronger north or west component as the preceding one. A second value of the direction indication data is indicative for a negative direction, i. e. having a stronger south or east component as the preceding one. The mean velocity values from the sensing module 10 and position and time data from the positioning unit 6 are fed to the controller 14 for further processing.

FIG. 3 shows in a block diagram the sensing module 10 and track-related elements of the map synthesis module 17 of FIG. 1. The sensing module 10 includes a velocity sensor 24 and as examples of further sensors a temperature sensor 25 and a humidity sensor 26. The sensors 24, 25, 26 are connected to the controller 14 of the sensing and interface unit 9.

The track-related elements of the map synthesis module 17 include a track record generator 27 connected to the controller 14 of the sensing and interface unit 9 and a track record timer 28. The track record timer 28 feeds time data relating to respective track points 22 into the track record generator 27. The map synthesis module 17 further comprises a presence information memory 29 for storing received presence data from the radio unit 2.

The presence data stored in the presence information memory 29 are fed to a density estimating module 30 for estimating a traffic density on the basis of the number of received presence data messages and synthesis data messages per time unit. The output of the density estimating module 30 significant for an estimated traffic density is fed from the density estimating module 30 into the track record generator 27. The track record generator 27 is adapted to generate track record data including the vehicle-specific data of the sensing module 10. The track record data are stored in a track record memory 31. Furthermore, the track record generator 27 is arranged to generate track presence data to be stored in a track presence data memory 32. The track presence data include data relevant for presence data messages, i. e. the number of received present data messages received in specific track segments 23.

Figure 4:
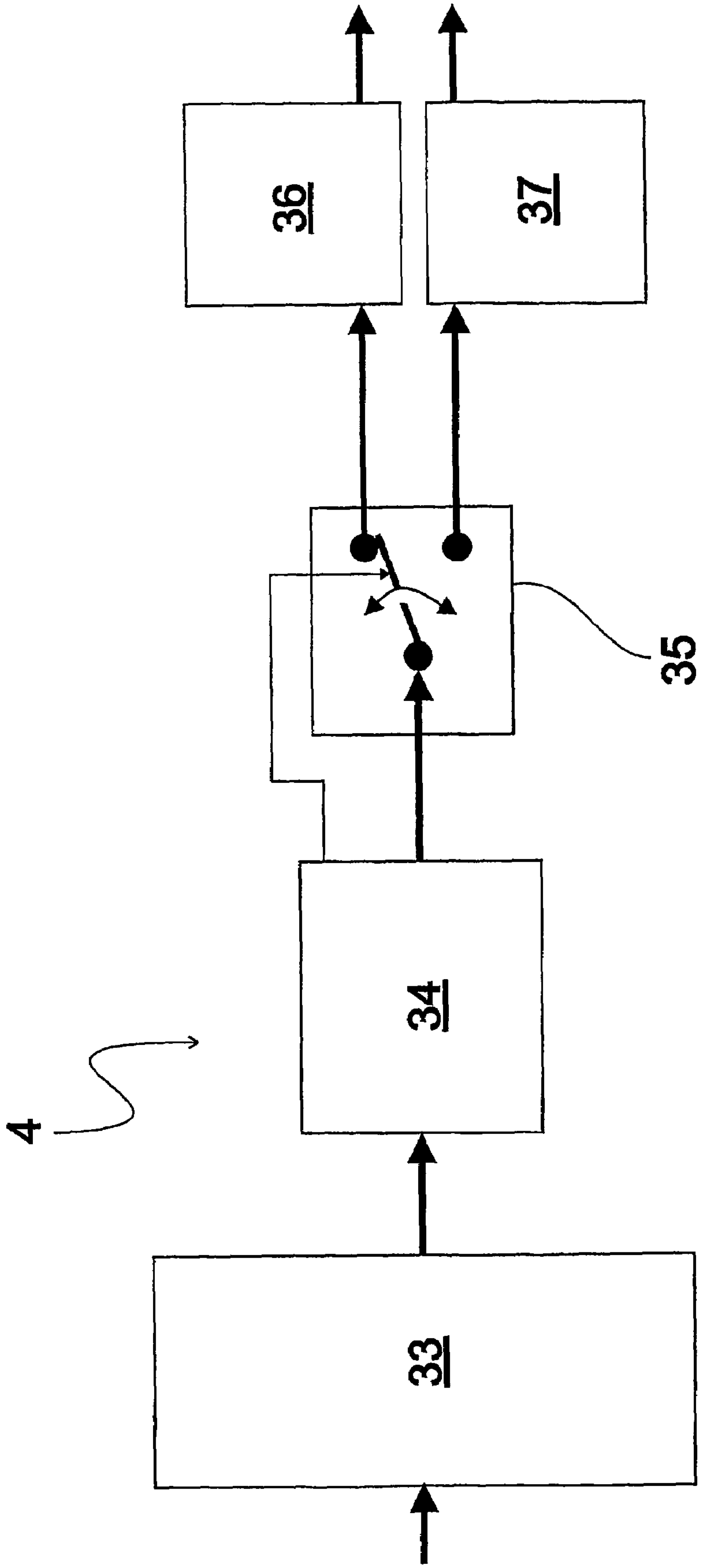

FIG. 4 shows in a block diagram elements of the receiving module 4 of the embodiment according to FIG. 1. The receiving module 4 comprises a received data message memory 33 for storing the data messages received from the mode selector 3. On the output side, the received data message memory 33 is connected to a received data message discriminator and processor 34 for analyzing the received data messages and arranging the received data in an appropriate format. Depending on the analyzing result, i. e. whether the received data message was a synthesis data message or a presence data message, the received data messages are directed via a message type selector 35 into a received synthesis data message memory 36 and a received presence data message memory 37, respectively.

FIG. 5 shows in a block diagram further elements of the receiving module 4 of the embodiment according to FIG. 1. The received presence data messages stored in the received presence data message memory 37 are fed through a presence data message decompiler 38 for decompiling, a presence data message decryptor 39 for decryption and a presence data message decoder 40 for decoding and finally storing in the received presence data memory 29 of the map synthesis module 17.

FIG. 6 shows in a block diagram further elements of the receiving module 4 of the embodiment according to FIG. 1 for further processing of the received synthesis data messages. The received synthesis data messages stored in the received synthesis data message memory 36 are fed to a synthesis data message decompiler 41 for decompiling. The output of the synthesis data message decompiler 41 is fed to a map synthesis data decryptor 42 for decrypting and further processing of map synthesis data and an additional data decryptor 43 of additional data processing means for further processing of additional data like the temperature and/or the humidity in a specific track segment 23, respectively. The map synthesis data decryptor 43 is followed by a map synthesis data decompressor 44 for data decompressing, a map synthesis data decoder 45 for decoding and a received map synthesis data memory 46 for storing received map synthesis data. Similarly, the additional data decryptor 43 is followed by an additional data decompressor 47, an additional data decoder 48 and a received additional data memory 49 for storing the received additional data, all included in the additional data processing means.

FIG. 7 shows in a block diagram the fundamental functioning of the map preprocessing module 16 of the map processing unit 15 of FIG. 1. The map preprocessing module 16 comprises a first series starting map memory 50 which is connected to the received map synthesis data memory 46 of the receiving module 4. The map preprocessing module 16 comprises a number of first series map memories 51, 52, 53, 54 connected in series after the first series starting map memory 50, whereby in FIG. 7 only four first series starting memories are shown. Each first series map memory 51, 52, 53, 54 is connected to the map synthesis module 17 of the map processing unit 15. The last first series map memory 54 of the number of the first series map memories 51, 52, 53, 54 is connected to a second series starting map memory 55 which in turn is followed by a number of second series map memories 56, 57, 58, 59, each connected to the map synthesis module 17. The last second series map memory 59 is connected to a further series starting map memory (not shown) and so forth. A last series starting map memory 60 is followed by a number of last series map memories 61, 62, 63, 64, each connected to the map synthesis module 17.

Between the final last series map memory 64 and the preceding last series map memory 63 there is a checking member 65 for checking whether there are any map synthesis data stored in the preceding last series map memory 63. If the preceding last series map code 63 is empty, the map synthesis data stored in the final last series map memory 64 are kept for reference with time stamp data indicative of the age of said map synthesis data.

According to the arrangement of the map preprocessing module 16, the map synthesis module 17 receives map synthesis data stored in any of the map memories 51 to 54, 56 to 59, 61 to 64 after data processing explained below.

FIG. 8 shows in a block diagram in more detail the map preprocessing module 16. The first series starting memory 50 is followed by a received map evaluation member 66 adapted to allocate an evaluation value to the map synthesis data on the basis of the time stamp data indicative for the time of generation of the respective map synthesis data. The map synthesis data modified by the respective evaluation value are transferred to a first series data adding member 67 for adding supplemental data like weather characteristics of geographically corresponding points of received and stored map synthesis data to the respective evaluated map synthesis data. The first series data adding member 67 furthermore serves to identify the points of the same geographical position and to sum up the speed values and density values related to the same direction indication data.

The output of the first series data adding member 67 is stored in a collected first series synthesis memory 68 for extracting characteristics of geographically corresponding points of received and stored map synthesis data for re-input into the first series data adding member 67. The map synthesis data of the collected first series synthesis memory 68 are stored in a first series synthesis postprocessor 69. The first series synthesis postprocessor 69 eliminates point scattering by best-fit line approximation of the map synthesis data to yield a map-like presentation including the collected data. The first series synthesis postprocessor 69 is also connected to a map synthesis timer 70 for the input of the current system time to an evaluation process of a track record evaluation member 71 which itself is connected to the track record memory 31 for evaluating the track record data. A counter 72 connected to the first series synthesis postprocessor 69 serves for counting the received synthesis data messages.

The output of the first series synthesis postprocessor 69 is fed into the chain of first series map memories 51 to 54 for further processing as explained in connection with FIG. 7.

FIG. 9 shows in a block diagram elements of the map preprocessing module 16 relating to the processing of the map synthesis data received from the final first series map memory 54 for generating of the second series map synthesis data. The map synthesis data received from the last first series map memory 54 are fed into a received map evaluation member 73 for multiplying characteristics of synthesis points with a evaluating value depending on the relevance of the characteristics of the synthesis points. The output of the received map evaluation member 73 is directed via a memory member 74 to a second series data adding member 75, a second series synthesis memory 76 and a second series synthesis postprocessor 77 adapted to and serving for the same purposes as the corresponding elements explained in FIG. 8 in connection with the first series map synthesis data processing. The output of the second series synthesis postprocessor 77 is fed into the chain of second series map memories 56 to 59 explained in connection with FIG. 7.

The processing of the map synthesis data stored in the further map memories is performed corresponding to the map synthesis data processing explained in FIG. 9. It should be noted that the evaluation process of the received map evaluation members 66, 73 may also be performed by a single map evaluation member switched between respective map memories.

FIG. 10 shows in a block diagram elements of the map synthesis module 17. The first series postprocessor 69 is followed by a first series map evaluation member 78. The second series synthesis postprocessor 77 is followed by a second series map evaluation member 79. Similarly, further i-th series synthesis postprocessors (not shown) are followed by further i-th series map evaluation members (not shown) up to the total number of n-th series synthesis postprocessors.

Furthermore, the map memories 51, 52, 63, 64 of the first, second and finally n-th series are each followed by a map evaluation memory member 80, 81, 82, 83. The output of the map evaluation members 78, 79 and map memory evaluation members 80 to 83 are connected to a map data adding member 84 for adding characteristics of geographically corresponding points of stored and evaluated map synthesis data. The overlaid map synthesis data are fed to a map synthesis postprocessor 85 for eliminating of point scattering and disregarding non-consistent data. The result of map synthesis post processing of the map synthesis postprocessor 85 is stored in a map synthesis memory 86.

FIG. 11 shows in a block diagram further elements of the map synthesis module 17. The map synthesis data stored in the map synthesis memory 86 are put through a map synthesis encoder 87 for encoding, a map synthesis compressor 88 for compressing and a map synthesis encryptor 89 for encrypting the map synthesis data, respectively.

The map synthesis module 17 further comprises an additional information generating module 90 of the additional data processing means connected to the controller 14 and the received additional data memory 49 for generating additional information data to be stored in an additional information memory 91 of the additional data processing means. The additional information data stored in the additional information memory 91 are fed through an additional information encoder 92 for encoding, an additional information compressor 93 for compressing and an additional information encryptor 94 for compressing of the additional information data, respectively, each included in the additional data processing means. Examples for additional information are the positions of observed speed controls, dangerous obstacles, roadworks or extreme weather conditions. This information may be entered by means of the input module 11.

The map synthesis encryptor 89 and the additional information encryptor 94 are connected to a synthesis data message compiler 95 for compiling the map synthesis data to synthesis data messages. The synthesis data messages are stored in a synthesis data message memory 96.

FIG. 12 shows in a block diagram further elements of the map synthesis module 17. The map synthesis module 17 comprises a presence data encoder 97 for encoding track presence data stored in the track presence data memory 32. The presence data encoder 97 is followed by a presence data encryptor 98 for encrpyting and a presence data compiler 99 for compiling presence data to presence data messages. The output of the presence data compiler 99 is stored in a presence data message memory 100.

FIG. 13 shows in a block diagram further elements of the map synthesis module 17 following the synthesis data message memory 96 and the presence data message memory 100. The synthesis data message memory 96 and the presence data message memory 100 are connected to a broadcast type selector 101. The broadcast type selector 101 is switched by a broadcast message control 102 including a time control 103. Depending on the output of the time control 103, the broadcast message control 102 switches the broadcast type selector 101 in such a way that the synthesis data message memory 96 or the presence data message memory 100 are connected to the broadcasting module 5 for broadcasting the respective data message.

FIG. 14 shows in a block diagram the time control 103 mentioned in connection with FIG. 13. The time control 103 comprises a stochastic process controller 104 connected to a synthesis data message stochastic time generator 105, a presence message stochastic time generator 106 and a stochastic blocking time generator 107. The synthesis data message stochastic time generator 105 calculates on the basis of the number of received presence data messages per time unit the next point in time for broadcasting a synthesis data message. In case of an extremely low density of presence data messages the point of time for broadcasting the next synthesis data message is as close as possible to the current time. The presence data message stochastic time generator 106 calculates on the basis of a stochastic algorithm and the estimated time for starting the broadcasting of a synthesis data message and the respective estimated end of broadcasting time the point in time for broadcasting the next presence data message. The stochastic blocking time generator 107 generates a rescheduling time for rescheduling the broadcast of a synthesis data message in case that synthesis or presence data message are just received and processed in the in the radio unit 2.

Furthermore, the time control 103 includes an inactivity timer 108 for generating an inactivity time during which no synthesis or presence data message has been received. If the inactivity timer 108 achieves a given predefined threshold time a synthesis data message will be send upon receipt of any synthesis or presence data message.

FIG. 15 shows a time diagram including a time axis 109 to visualize the broadcasting process of synthesis data messages 110. Each synthesis data message 110 comprises a synthesis beginning part 111 at the beginning of the synthesis data message 110 followed by a longer synthesis information part 112 in the middle of the synthesis data message 110 and a synthesis termination part 113 for terminating the synthesis data message 110. The total time for broadcasting a synthesis data message is about 250 milliseconds.

The time $\tau_i$, $\tau_{i+1}$, $\tau_{i+2}$ between consecutive synthesis data messages 110 is determined by the synthesis data message stochastic time generator 105 and differs from one synthesis data message 110 to the next synthesis data message 110. The time intervals $\tau_i$, $\tau_{i+1}$, $\tau_{i+2}$ between consecutive synthesis data messages 110 correspond to at least the length of a synthesis data message 110, however preferably to a multiple of the length of time of the synthesis data message 110.

FIG. 16 shows a time diagram including a time axis 114 for visualizing the broadcasting process of presence data messages 115. As may be seen from FIG. 16, each presence data message 115 comprises at the beginning a presence beginning part 116 followed by a presence information part 117 in the middle and a terminating presence termination part 118 at the end of a presence data message 115. Furthermore, it can be seen, that most of the time intervals $\gamma_i$, $\gamma_{i+1}$, $\gamma_{i+2}$ between presence data message 115 are of the same length as the presence data message 115 which have a length of typically 1 millisecond. Therefore, presence data messages 115 are broadcasted with a overall higher repetition rate than synthesis data message 110.

FIG. 17 to FIG. 20 show in schematic diagrams the output of display means of the embodiment of the present invention explained above in the course of reception of various synthesis data messages from vehicles equipped with devices according to the present invention.

Figure 17:
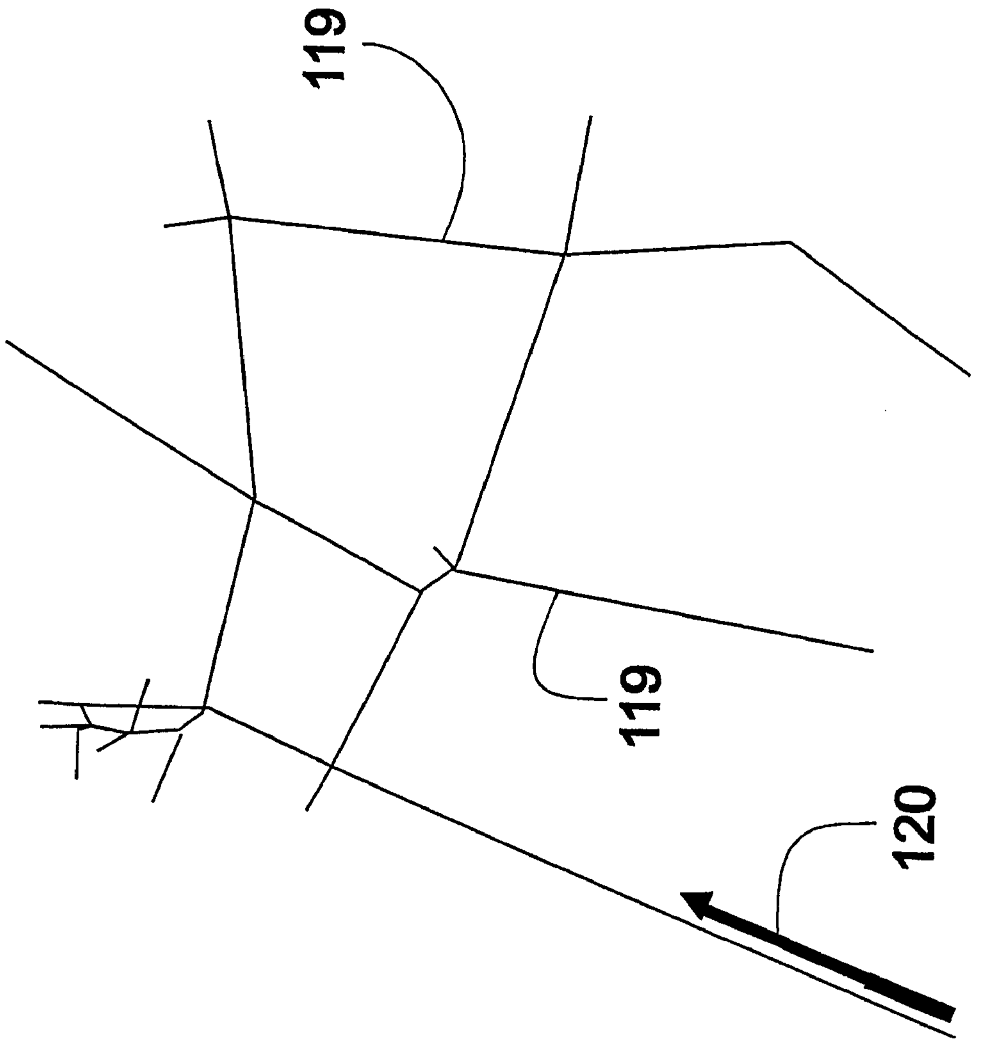

FIG. 17 shows in thin lines 119 routes, e. g. highways and freeways, included in an electronic route map system or stored from a previous map synthesis keeping the route location information only according to a further embodiment given below. First arrow 120 represents synthesis data of generated and broadcasted synthesis data messages of a first vehicle moving in the direction of the first arrow 120.

Figure 18:
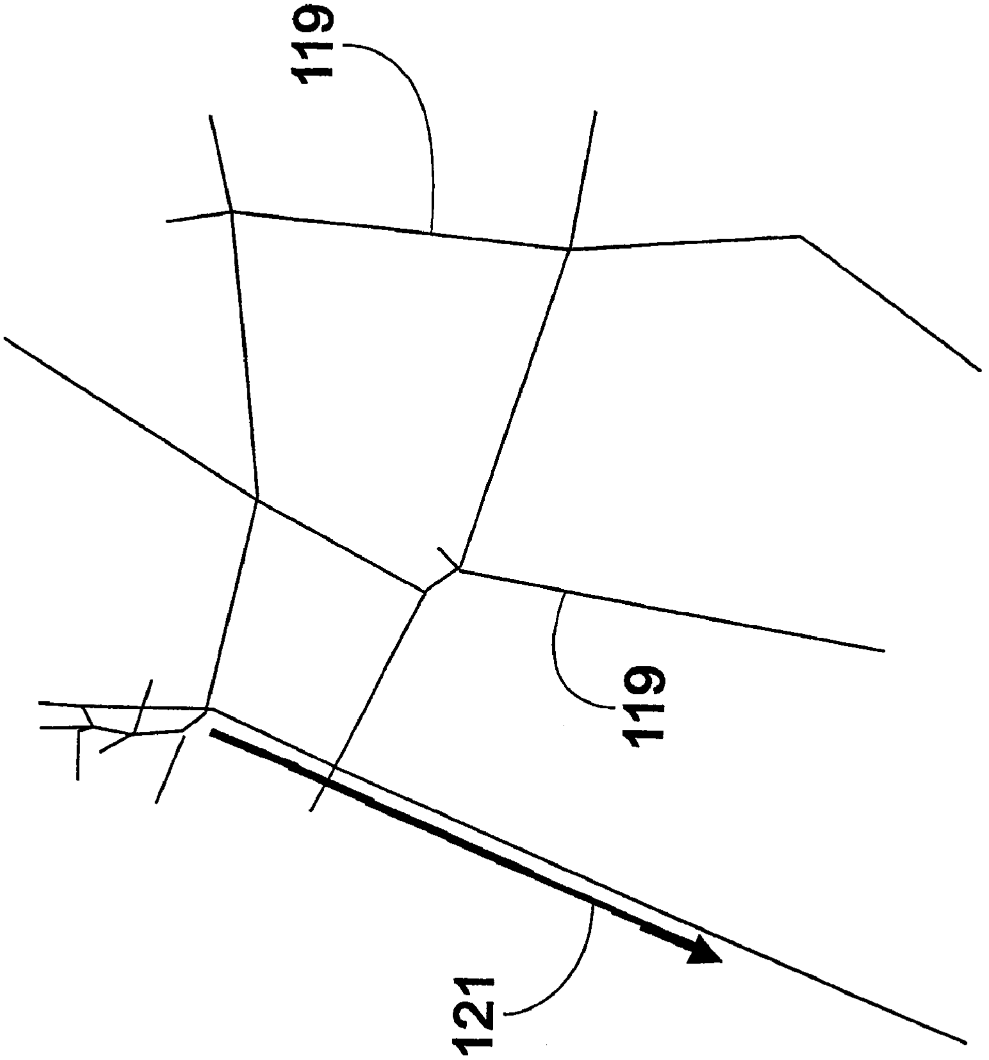

FIG. 18 represents the same route map as in FIG. 17, however including a second arrow 121 representing the synthesis data of generated and broadcasted synthesis data messages of a second vehicle moving on the same route but in the opposite direction as the first vehicle as indicated by the second arrow 121.

FIG. 19 shows the same route map as in FIG. 17 and FIG. 18. At the time of displaying of the route map of FIG. 19, the first and second vehicle have met and have incorporated the received synthesis data messages of the other vehicle in their own synthesis data. Therefore, the now combined synthesis data of the first and second vehicle are shown as a first lines 122 based on the first arrow 120 and on the second arrow 121 of FIG. 17 and FIG. 18, respectively. The first lines 122 represent the synthesis data now present in the first and second vehicles. Further more, FIG. 19 includes a third arrow 123 representing synthesis data of a moving third vehicle which has partially used the same route as the second vehicle.

FIG. 20 shows the output of the device of the first vehicle after having received synthesis data messages from the third vehicle moving in opposite direction. As one may see from FIG. 20, now the synthesis data of the first vehicle represented by second lines 124 include in addition to its own synthesis data inseparably combined the broadcasted and received synthesis data from the synthesis data messages of the second and third vehicle.

FIG. 21 shows in a block diagram corresponding to the block diagram of FIG. 1 of the embodiment illustrated and explained above the main functional elements of a further embodiment of a device according to the present invention. In FIG. 1 and FIG. 21 the same reference signs are used for corresponding functional elements which have already been explained above.

The radio unit 2 of the embodiment according to FIG. 21 comprises a separate receiving module 125 and a separate broadcasting module 126 for separately performing the receiving and broadcasting functionalities. The separate receiving module 125 is connected to a receiving mode selector 127 of the radio unit 2 separating received synthesis data messages and received presence data messages. Similarly, the separate broadcasting module 126 is connected to a broadcasting mode selector 128 for switching between synthesis data messages and presence data messages to be broadcasted.

The map preprocessing module 16 of the map processing unit 15 of the further embodiment illustrated in FIG. 21 comprises a synthesis data message preprocessor 129 and a presence data message preprocessor 130 for preprocessing of the received synthesis data messages and presence data messages, respectively. The preprocessing of the received synthesis data messages and presence data messages is performed as explained in connection with the above embodiment.

The map synthesis module 17 of the map processing unit 15 of the embodiment of FIG. 21 includes a map synthesis processor 131 for generating map synthesis data according to the principles of the above-explained embodiment. However, the map synthesis module 17 of the further embodiment of FIG. 21 comprises a route map skeleton generator 132 connected to the map synthesis processor 131. The map synthesis module 17 of FIG. 21 further comprises a route map skeleton track record generator 133 and a synthesis data message generator 134 for generating synthesis data messages according to the principles of the above-explained embodiment.

The route map skeleton generator 132, the route map skeleton track record generator 133 and the map synthesis processor 131 are adapted to generate in cooperation route map skeleton data extracted from the map synthesis data. The route map skeleton data represent the location data of routes extracted from the position data included in the map synthesis data.

A presence data message generator 135 of the map synthesis module 17 of FIG. 21 serves for generating presence data messages based on the principles explained in connection with the before-mentioned embodiment.

FIG. 22 shows in a block diagram elements of the map preprocessing module 16 and the map synthesis module 17 of the further embodiment illustrated in FIG. 21. Corresponding elements of FIG. 10 relating to the above-explained embodiment and FIG. 22 have the same reference signs and have been explained in connection with FIG. 10. According to the embodiment of FIG. 22, the route map skeleton generator 132 is connected to the map synthesis memory 86 for extraction of the route location data from the synthesis data stored in the map synthesis memory 86. The route map skeleton generator 132 comprises a route map skeleton extractor 136 for extraction of the route location data and a route map skeleton memory 137 for storing the route location data.

By generating route location data on the basis of vehicle-specific synthesis data and received synthesis data including route location data from further vehicles the accuracy of the position data and especially of the route location data are considerably enhanced beyond the accuracy of the positioning data which are about 10 meters. By overlaying a multitude of position data and applying an algorithm implemented in the route map skeleton generator 132 disregarding strongly deviating position data and calculating mean position data on the basis of the remaining position data an accuracy of the position data of about 1 meter or less may be achieved. Therefore, the route location data of high accuracy may be used for further processing of synthesis data as reference or as basis for further improvement of the route location data.

FIG. 23 shows in a block diagram elements of the map synthesis module 17 of the further embodiment illustrated in FIG. 21. Corresponding elements in FIG. 23 and FIG. 11 relating to the above-explained embodiment have the same reference signs and are explained in detail in connection with FIG. 11. The map synthesis module 17 of the further embodiment comprises a map synthesis condenser 138 for reducing the data density of the synthesis data to be broadcasted by approximating the paths in the synthesis data by segments of a predefined length. As an example the predefined length may be between about 15 meters and 500 meters.

The invention claimed is:

1. A device for exchanging data between moving vehicles (19) comprising a receiving module (4) for receiving data messages broadcasted from other vehicles (19) equipped with said device, sensing and processing means (6, 9, 15) for generating vehicle-specific data and a broadcasting module (5) for broadcasting data messages including said received data and said vehicle-specific data, whereby the device further includes data processing means (16, 17) inseparably combining corresponding data from said received data and from said vehicle-specific data to synthesis data messages comprising time stamp data, whereby the broadcasting module (5, 126) is adapted to broadcast said synthesis data messages and whereby said data processing means (15, 16) include at least one evaluation member (66, 73, 78, 79, 80, 81, 82, 83) for evaluating the contribution of received synthesis data messages according to said time stamp data, characterized by further including a route map skeleton generator (132) and a route map skeleton extractor (136) for generating route location data extracted from synthesis data messages.

2. A device according to claim 1, characterized in that the at least one evaluation member (66, 73, 78, 79, 80, 81, 82, 83) attributes a higher evaluation value for more recent received synthesis data and lower evaluation value for older received synthesis data.

3. A device according to claim 1, characterized by further including a stochastic process controller (104) comprising at least one stochastic time generator (105, 106, 107) for rescheduling synthesis data messages upon receipt of activity signals of the receiving module (104, 125).

4. A device according to claim 3, characterized in that said broadcasting module (5, 126) and said stochastic process controller (104) are sensitive for the number of received presence data messages per time unit.

5. A device according to claim 1, characterized by further including presence message receiving and generating means (5) adapted to receive and generate presence data messages with a data length that is lower than the data length of synthesis data messages.

6. A device according to claim 1, characterized in that the vehicle-sensitive data include the mean velocity of the respective vehicle (19) within a specific track segment.

7. A device according to claim 1, characterized in that the vehicle-sensitive data include direction indication data of the respective vehicle (19).

8. A device according to claim 1, characterized by an input module (11) and additional data processing means (43, 47, 48, 49, 90, 91, 92, 93, 94) for processing of additional user-specific data.

* * * * *